Aug. 10, 1937.                H. STECHERT                2,089,927
                          ANTIDAZZLE HEADLIGHT
                           Filed May 6, 1935

Inventor
Hermann Stechert

Patented Aug. 10, 1937

2,089,927

UNITED STATES PATENT OFFICE 2,089,927

ANTIDAZZLE HEADLIGHT

Hermann Stechert, Kemberg, Germany

Application May 6, 1935, Serial No. 20,103
In Germany May 3, 1934

2 Claims. (Cl. 240—41.4)

The invention relates to improvements in headlights of motor cars, and has for its object the provision of a device adapted to render impossible the dazzling effect of such headlights, without the necessity of any additional means having to be operated by the driver of a vehicle.

It has been proposed already to counteract the effects of powerful headlights by either a dimming apparatus being brought into action by a passing driver, or by a light subduing screen composed of colored glass and capable of being placed and held in the positions required. However, these devices have not given entire satisfaction for reasons well known to every driver of a motor car.

The present invention obviates the drawbacks arising from the dimming of headlights or from the use of a subduing screen, by an improved and novel construction of the front glass member of the headlight, the said construction having the advantage of automatically protecting the eyes of a driver from the glare of approaching headlights, without taking his attention from the road in front which remains fully illuminated.

The main object of the invention is to provide a headlight, the front part of which is constituted by two glasses in the shape of a bowl, the said glasses having identical form but not identical size, so as to enable the smaller one to fit into the larger one which is the outer or front glass proper and which is separated from the inner one by a free space being left. These two bowls of glass have flat made bottom portions, and their rearwardly bent portions are made in the shape of convex-concave semi-lenses. Another object of the invention consists in the provision of a filling material within the free space left between the two bowls, the said filling material being constituted by limpid crystals of glass having quite irregular form, and by a glycerine-gelatin mass as an embedding means for said crystals. A further object of the invention, in accordance with a modification proposed, consists in the front part of the headlight being constituted by but one bowl-shaped glass and in embedding crystals of glass of quite irregular form into the very material of the front glass. Again, an object of the invention is to have limpid glass crystals arranged over the upper half of the front sheet so as to form ribbons vertically disposed and spaced from one another, and to form a crescent-like semi-circle, and to have colored filter glass crystals arranged over the lower half of the front sheet so as to form also ribbons vertically disposed and spaced from one another.

Again, an object of the invention consists in the provision of a semi-disc made of aluminium and highly polished, in rearward position to the upper half of the front sheet, and in subdividing said semi-disc into spaced grid-like ribbons, the said semi-disc having for its function to deviate reflected luminous rays, from the upper half of the headlight to the lower half thereof for the purpose of affording, in case of foggy weather, a yellow light favorizing suppression of the dazzling effect and capable of traversing the fog. Again, an object of the invention is to have the curvature of the bowl, which is in the shape of a convex-concave semi-lens, improved in its structure. Other features and advantages of the invention will become apparent from the following description and the accompanying drawing.

Figure 2:
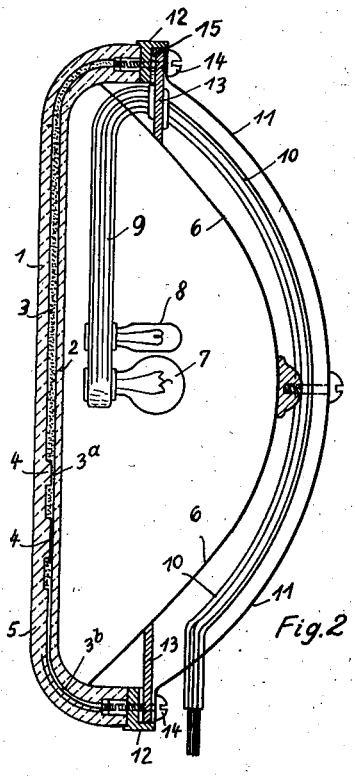
Fig. 2 is a vertical section taken on line 2—2 of Figure 1.
Figure 1:
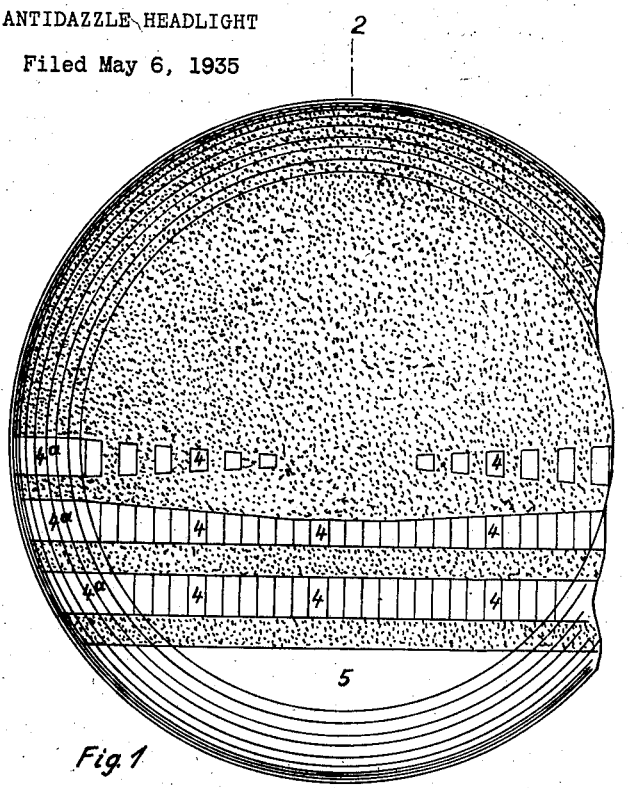
Fig. 1 is a front elevation of a headlight constructed in accordance with the invention.

Referring to Figs. 1 and 2 of the drawing, the headlight comprises the usual front part which, in the present instance, is constituted by two glasses made in the shape of a bowl. These glasses made in the shape of a bowl. These bowls 1 and 2 are of identical shape, but not of identical size. The outer bowl, designated by the numeral 1, is adapted for the reception of the inner bowl 2, which has its upper half made in matt glass and which so fits into the former that a free space 3 is being left between both bowls, the said space being narrower in width in its lower part than in its upper part. The said bowls have their bottom portion made flat and their rearwardly bent portion made in the form of semi-lenses having convex-concave shape and being quadrant-like. The free space 3 is designed for the reception of a filling material, composed half of crystals and half of a mixture intended for the embedment of said crystals. The latter are of limpid glass and have quite irregular form, and the mixture is composed of glycerine and a limpid gelatin mass. The crystals are obtained by crushing glass by stamping action and have a size of from 1 to 3 millimeters. A particular advantage of the gelatin mass consists in a secure fog headlight being realized by th addition to said mass of light yellow color soluble in alcohol.

In the lower half of said space 3 left between the two bowls 1 and 2, there are disposed, in horizontal direction, rows of light colored ribbons 4, made of suitable material and of special shape, and arrangement. These band-like elements reach beyond the arc-shaped curvatures of the bowls 1 and 2, and are there designated by the numeral 4a. Beneath the lowermost disposed ribbon 4, there is installed, at the inner side of the outer bowl 1, a light colored segment or arc 5 extending as far as the end of the curvatures of the bowls.

The numeral 6 designates the reflector made in the shape of a parabolic mirror and fastened by means of a screw in usual manner. The source of light is designated by the numeral 7, the auxiliary source of light by 8, the guide arm for the cable by 9, the cable itself by 10, the rear part of the headlight casing by 11, a piece of metal in connection with both bowls, by 12, and the iron frame situated inside the headlight and adapted for holding the reflector in its position, by the numeral 13, the said frame being fastened by means of screws 14 to said piece of metal 12 and to said rear part of the headlight casing, respectively. Between the metal member 12 and the iron frame 13, there is placed a rubber ring 15, for tightening purposes.

It may be pointed out that the elements spoken of above and designated by the numerals from 6 to 15 inclusive, do not form an object of the present invention and are not claimed as features.

The arrangement described has the advantage that, owing to the limpid crystals of glass embedded in the limpid gelatin mass, the light rays passing through said filling material which is placed within the free space left between the two bowls, do suppress the dazzling effect of the light given out, and this result is due to the irregular form of said glass grains or crystals causing irregular refraction of light. The arrangement proposed is permanently operative and automatically protects the eyes of a driver from the glare of approaching headlights. Furthermore, as all of the luminous rays do pass through the filling material, the road in front of the vehicle remains fully illuminated.

Another advantage results from the special shape given to the bent portions of the bowls 1 and 2, which do constitute, as hereinbefore described, convex-concavo semi-lenses corresponding in form to a quadrant. Owing to the shape of said bends or curved portions, the luminous rays emitted on the one hand by the source of light and reflected on the other hand by the reflector, and passing through said curved portions, are gradually deviated in lateral direction and little by little deviated in rearward direction so that a good illumination of the road in its curves as well as in lateral and rearward directions will be obtained.

Figure 4:
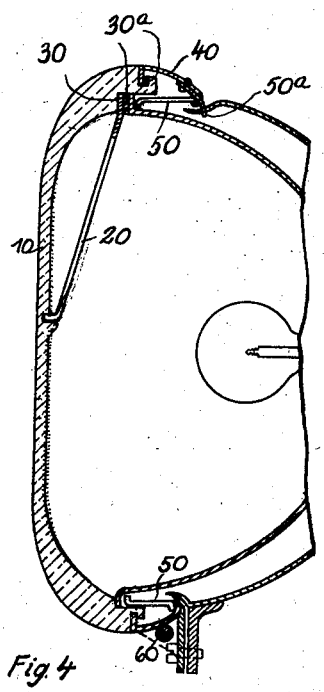
Fig. 4 is a vertical section taken on line 4—4 of Figure 3.
Figure 3:
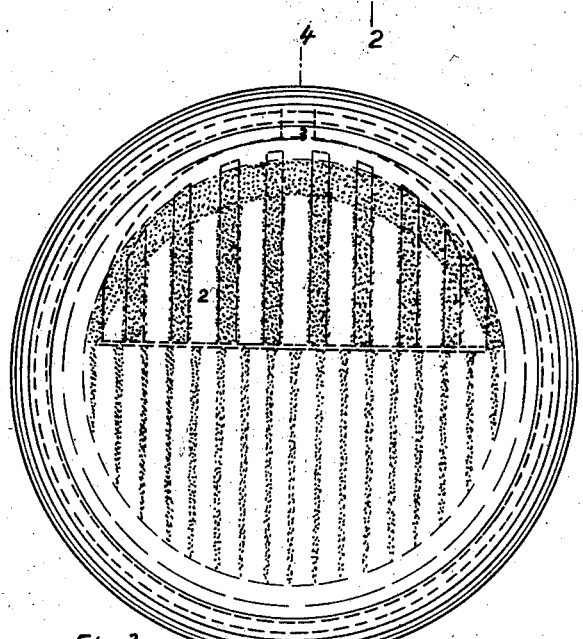
Fig. 3 is a view similar to Figure 1, but showing a modified form of construction.

In the modification shown in Figs. 3 and 4 of the accompanying drawing, the construction of the headlight is simplified in that the second or inner bowl has been omitted and that it has been done away with the filling means, in the nature of the glycerine mixture and gelatin mass, and with the embedded band-like elements. In accordance with this modification, the construction comprises but one front glass in the shape of a bowl 1. In the upper half of this bowl, and at the inner side thereof, there are embedded into its material, limpid crystals of throughout irregular form, which crystals owing to the irregularity of their faces, do leave minute spaces between one another. Embedment of these crystals into the glass mass is made in a quite special manner, that is on the one hand in vertical position in the form of ribbons having a determinate width, and on the other hand in the form of a crescent, so to say topping said ribbons. In rearward position to the upper half of said glass bowl, there is mounted a semi-disc 20 made of aluminium and highly polished. The said semi-disc has its base bent so as to allow its seating upon a horizontal projection of the glass mass and its cementing within a slit provided for in the wall of the bowl. The periphery of said disc carries in its middle part a projecting portion 30 adapted to bear against an offset face of the wall of the bowl and securely held in place by the flange of the reflector so that said semi-disc occupies a rearwardly inclined position. Said semi-disc 20 is in the manner of a grid subdivided into ribbons or bands of determinate width leaving free spaces between one another, the said spaces thus allowing passage of the luminous rays through the parts of the front glass carrying embedded the limpid crystals in ribbon-like arrangement which latter does correspond to the arrangement of said grid-like spaces. Both surfaces of the semi-disc of aluminium are hardened in accordance with the well known Eloxal method whereby the rear surface is given a light yellow colorization, and the front surface a dark blue one fastened to light. The said "Eloxal" method consists in oxidizing the surface of an object made of aluminium, electrolytically-anodically by using different kinds of current, voltages, and compositions of electrolyte. The top layer is thus changed into oxide of aluminium and possesses a character which enables the said surface, when dipped into solutions of color, to absorb dyestuffs. The numeral 40 designates a metal ring which serves as connecting means between bowl 1 and the outer casing of the headlight, and which is provided with a spring member 50 adapted to press the flange of the reflector against the body of the bowl, whereas the numeral 60 designates the screw designed to draw together the said metal ring in the manner of a clamping ring. A rubber joint is secured between the front glass and the flange of the reflector, for tightening purposes.

Another feature of the modified form of construction consists in embedding crystals of irregular shape into the mass of the lower half of the front glass, at the inner side thereof. These crystals are designated by the numeral 80 and, unlike the limpid crystals, composed of colored filter glass, the colorization being preferably light citrine. Embedment of the said crystals is made in the form of vertically disposed ribbons having each a width of about from 3 to 4 millimeters and being spaced from one another so that the distance, measured from middle to middle of each ribbon, amounts to about 10 millimeters. The top portion of said ribbons lies about 10 millimeters above the horizontal diameter of the front glass, and their end portions reach so far down as to enter the curvature of the bowl. The said curvature is executed similarly to the construction shown in Figures 1 and 2 of the drawing and represents the form of a convex-concave semi-lens, but in the present instance, its structure has been somewhat modified in such a manner that the gradual increase of the cross-section of the glass already begins in proximity to the centre of the bowl.

Owing to the arrangement proposed, emission of light through the upper half of the front glass will be advantageously reduced to about 20 per cent of its illuminating power, and a considerable amount of the rays given out are deviated and directed to the lower half of the front glass in which are embedded the irregularly shaped glass crystals having light citrine colorization. The said deviation of rays is caused by the highly polished semi-disc 20 made of aluminium and grid-like subdivided so that the spaces left for the passage of the rays are a trifle less wide than the embedded ribbons of crystals. The rays thus deviated and light-citrine reflected, do afford in the lower half of the front glass, and in case of foggy weather, a yellow headlight capable of preventing its dazzling effect and of traversing the fog so as to allow secure driving of a vehicle without the driver being obliged to have recourse to additional operative means. Furthermore, on account of the front surface of the semi-disc 20 of aluminium having a blue colorization, the dazzling effect of the upper half of the front glass I is entirely suppressed.

The construction described has finally the advantage of affording a more favourable and direct diffusion of light. In view of this, the curvature of the bowl I in the shape of a convex-concave semi-lens, has been given a pronounced improvement by gradually increasing the cross-section of the material in such a way that said increase does already begin in proximity to the centre of the front glass, whereby the use of a single filament lamp is rendered possible. Owing to the construction proposed, not only the road in front of a traveling vehicle is fully illuminated, but also a better lighting of the road curves is obtained by the rays passing through the bent portion of the bowl, the said lighting causing at the same time the rays to afford good illumination of the road in lateral and rearward directions. The thus realized, improved diffusion of light has the advantage that the eyes of the driver of an approaching car are only met by a part of the rays reflected by the reflector and directed to that place, whereas all of the other rays are deviated from the driver's eyes so that always a clear vision is obtained.

It will be seen from the foregoing that the invention is exceptionally simple and novel. It may be added that such excellent results have been obtained from the details disclosed that they are preferably followed. While I have shown and described two preferred forms of embodiment, it is obvious that slight differences in structure may be resorted to without departing in any manner from the spirit of the invention, as interpreted by the accompanying claims.

I claim:

1. An antidazzle headlight of the character described, having a casing, a front glass, a source of light and a reflector, such front glass being made in the shape of a bowl having a flat front portion and a peripheral bent portion made in the form of a convex-concave semi-lens, glass crystals of minute size and of irregular shape embedded in the material of the said front portion at the inner side thereof, said crystals comprising grains of limpid glass and grains of colored filter glass, said grains of limpid glass being, in the upper half of said front portion, disposed in the form of ribbons in vertical arrangement and spaced one from the other, and in the form of a crescent, said grains of filter glass which have a light citrine colorization, being disposed in the lower half of said front portion in the form of ribbons in vertical arrangement and spaced one from the other, a semi-disc made of highly polished aluminium and disposed in inclined rearward position with respect to the upper half of said flat front portion, means for securely holding in place said semi-disc of aluminium, the front side of which has a blue colorization and the back of which has a light citrine colorization adapted for reflecting purposes, the said semi-disc being in the manner of a grid subdivided into vertical ribbons, the spaces left between said ribbons designed for the passage of the luminous rays being less wide than the said vertically disposed ribbons of limpid glass crystals adapted to prevent the dazzling effect of the luminous rays sent out, the vertical cross-section of the convex-concave portion increases from the center of the bowl to the edge thereof so as to diffuse light rays laterally, rearwardly as well as forwardly of the vehicle.

2. An antidazzle headlight of the character described, having a casing, a front glass, a source of light, and a reflector, such front glass being made in the shape of a bowl having a flat front portion and a peripheral bent portion made in the form of a convex-concave semi-lens, limpid glass crystals of minute size and of irregular shape arranged in the upper half of the lens in the form of vertical ribbons spaced one from the other, and a disc having semi-circular shape and made of highly polished aluminium adapted for reflecting purposes, the said semi-disc being in the form of a grid subdivided into vertical ribbons, the spaces left between said ribbons designed for the passage of the luminous rays, being less wide than the said vertically disposed ribbons of limpid glass crystals adapted to prevent the dazzling effect of the luminous rays sent out.

HERMANN STECHERT.